(No Model.)
J. MILLER.
FILTER.
No. 271,098. Patented Jan. 23, 1883.
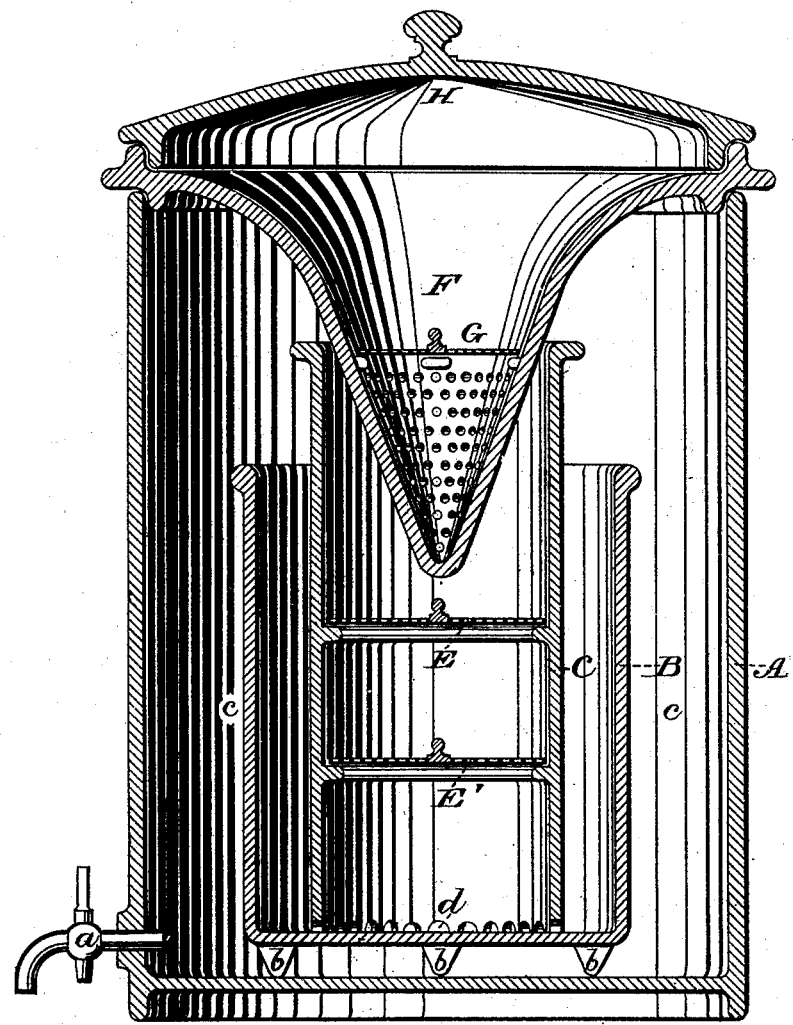
Witnesses:
Geo. H. Strong.
J. H. Nourse
Inventor,
James Miller
By Dewey & Co.
Attorney

UNITED STATES PATENT OFFICE.

JAMES MILLER, OF OAKLAND, CALIFORNIA.

FILTER.

SPECIFICATION forming part of Letters Patent No. 271,098, dated January 23, 1883.

Application filed October 16, 1882. (No model.)

*To all whom it may concern:*

Be it known that I, JAMES MILLER, of Oakland, county of Alameda, State of California, have invented an Improved Filter; and I hereby declare the following to be a full, clear, and exact description thereof.

My invention relates to a new and useful water-filter; and it consists in the arrangement of vessels with relation to each other, and in their various divisions into compartments, as will be hereinafter fully explained, reference being made to the accompanying drawing, in which the figure represents a vertical section of the filter.

I am aware that filters of a similar form of construction are old; neither do I claim the same, broadly; but my form of water-receiver and the compartments in my interior or primary filtering-chamber are the especial points of invention.

The object of my invention is to insure a proper filtering of water.

Let A represent an exterior vessel, having near its bottom a discharge-cock, $a$. Within this vessel is another, B, set on short legs $b$. This vessel is not as high as the exterior one, and is enough smaller in diameter to form a circumscribing water-space, $c$, which on account of the legs $b$ is underlying as well. Within the vessel B is a vessel or cylinder, C, of a height intermediate between vessels B and A. Its base rests on the bottom of vessel B, and is provided with a number of discharge-apertures, $d$, as shown. Supported upon suitable beads molded on the inside of the vessel C is a perforated plate, E, and another, E', lower down.

F is the water-receiver. It consists of a hollow inverted cone, the base of which is formed into a flange and rests upon the rim of the main vessel A. Its apex extends down within the interior vessel, C, almost to the first plate, E. It is provided with a perforated plate, G, and is itself perforated below the said plate.

H is the lid or cover for the device.

The entire device is to be made of what is known as "open porous terra-cotta," and the various divisions and spaces, except the water-space $c$, are to be filled with filtering materials. To explain more fully, I shall say, for example, that the compartment in the point of the receiver F under the perforated plate G shall be filled with charcoal. In the vessel C, above the plate E, will be placed gravel, the apex of the receiver extending well down into it. Between the plates E E' is to be placed marine sand, while under the plate E I shall put willow-charcoal. In the space between the vessels C and D will be marble-dust. When the lid H is removed water is poured into the receiver F. It passes down through the perforated plate G, and through the body of charcoal, finding its way through the perforated point of the receiver into the body of gravel in vessel C. It filters down through the perforated plates E E', the intervening marine sand, and the underlying body of willow-charcoal. It then finds its way through the bottom apertures, $d$, of vessel C into the marble-dust, through which it rises, and finally flows over the edge of vessel B into the water-space $c$ as well-filtered water.

Having thus described my invention, what I claim as new, and desire to secure by Letters Patent, is—

In a water-filter, the combination of the vessel A, the vessel B, between which is formed the water-space $c$, the interior vessel, C, having perforations $d$, said vessel being higher than vessel B, and between which and said vessel B filtering material is placed, perforated plates E E', dividing vessel C into compartments for containing various filtering substances, and the water-receiver F, supported on the rim of vessel A, and having a perforated point filled with a filtering material and extending into vessel C, and a perforated plate, G, in said point, substantially as herein described.

In witness whereof I hereunto set my hand.

JAMES MILLER.

Witnesses:
S. H. NOURSE,
J. H. BLOOD.